(12) United States Patent
Tanaka et al.

(10) Patent No.: US 7,499,541 B2
(45) Date of Patent: Mar. 3, 2009

(54) CIPHER STRENGTH EVALUATION APPARATUS

(75) Inventors: Hidema Tanaka, Koganei (JP); Toshinobu Kaneko, Noda (JP); Yasuo Hatano, Noda (JP)

(73) Assignee: National Institute of Information and Communications Technology, Tokyo (JP)

( * ) Notice: Subject to any disclaimer, the term of this patent is extended or adjusted under 35 U.S.C. 154(b) by 849 days.

(21) Appl. No.: 10/843,108

(22) Filed: May 11, 2004

(65) Prior Publication Data

US 2005/0257069 A1    Nov. 17, 2005

(51) Int. Cl.
 *H04K 3/00*  (2006.01)
 *H04K 1/00*  (2006.01)
 *H04L 9/00*  (2006.01)

(52) U.S. Cl. .............................. 380/28; 380/1
(58) Field of Classification Search ............ 380/1, 380/28
See application file for complete search history.

(56) References Cited

U.S. PATENT DOCUMENTS

| | | | | |
|---|---|---|---|---|
| 4,703,503 | A * | 10/1987 | Asai | 380/28 |
| 5,703,948 | A * | 12/1997 | Yanovsky | 380/262 |
| 5,835,600 | A * | 11/1998 | Rivest | 380/44 |
| 6,178,244 | B1 * | 1/2001 | Takeda et al. | 380/277 |
| 6,381,695 | B2 * | 4/2002 | Kudo et al. | 713/156 |
| 6,816,968 | B1 * | 11/2004 | Walmsley | 713/168 |
| 7,023,990 | B1 * | 4/2006 | Arita | 380/28 |
| 7,187,769 | B1 * | 3/2007 | Moriai et al. | 380/1 |
| 2002/0041683 | A1 * | 4/2002 | Hopkins et al. | 380/28 |
| 2003/0223579 | A1 * | 12/2003 | Kanter et al. | 380/28 |
| 2004/0101135 | A1 * | 5/2004 | Kanamaru | 380/28 |
| 2004/0208317 | A1 * | 10/2004 | Imai et al. | 380/44 |

OTHER PUBLICATIONS

H. Tanaka, C. Ishii, T.Kaneko; On the strength of Kasumi without FL functions against Higher Order Differential Attack; 2001; ICISC 2000, LNCS 2015, pp. 14-21.*
S. Langford & M. Hellman; Differential-Linear Cryptanalysis; 1994; Advances in Cryptology—CRYPTO 94, LNCS 839, pp. 17-25.*
L. Knudsen & J. Mathiassen; A Chosen-Plaintext Linear Attack on DES; 2001; FSE 2000, FSE 2000, LNCS 1978, pp. 262-272.*
Lai, Xuejia; Higher Order Derivatives and Differential Cryptanalysis, Reprint of pp. 227-233 from "Communications and Cryptography" (Ed. R. Blahut et al.), Kluwer Academic Publishers, 1994.
Knudsen, Lars R.; Truncated and Higher Order Differentials; Aarhus University, Denmark.
Matsui, Mitsuru; New Structure of Block Ciphers With Provable Security Against Differential and Linear Cryptanalysis; Information Security System Development Center, Mitsubishi Electric Corporation, Kanagawa, Japan.
Moriai, Shihi et al.; Higher Order Differential Attack of a Cast Cipher; Telecommunications Advancement Organization of Japan, Science University of Tokyo.

* cited by examiner

*Primary Examiner*—Kambiz Zand
*Assistant Examiner*—James Turchen

(57) ABSTRACT

An object of the invention is to allow cipher strength evaluation when available resources such as the complexity and the number of plaintext available for decryption have conditions, and to allow comparison of cipher strength under given conditions. The invention combines the exhaustive search with an algebraic method, sets conditions for resources such as the complexity and the number of plaintext available for decryption beforehand, and utilizes the linear dependency of a decryption equation for use in decryption to optimize a decryption method as the maximum number of available plaintext is secured. Thus, it reduces the complexity and allows efficient search of solutions for the decryption equation.

13 Claims, 8 Drawing Sheets

CIPHER STRENGTH EVALUATION APPARATUS

BACKGROUND OF THE INVENTION

1. Field of the Invention

The present invention relates to cipher strength evaluation.

2. Description of the Related Art

The usefulness of encryption algorithms relates directly to the difficulty of decryption, which can be evaluated from the costs for the ciphertext which is actually decrypted to measure the number of plaintext and the complexity required for decryption.

In a block cipher system having a plurality of steps of accepting unstirred text, stirring with an extended key, and outputting stirred text for encrypting plaintext step by step, it prepares a decryption equation being an equation that holds on stirred text, unstirred text and extended keys, performs exhaustive search by estimating and substituting solutions, and examines whether the equation holds or not to determine the true key.

However, the system requires enormous complexity for such an exhaustive search.

Then, it utilizes an algebraic decryption method for linearizing the decryption equation being higher-order polynomial expressions, and applies Gaussian Elimination to obtained linear simultaneous equations to suppress the complexity for determining the true key.

However, a lot of plaintext is needed instead.

SUMMARY OF THE INVENTION

The performance of computers and the availability of plaintext have limitations in accordance with environments in which people attempt decryption and do decryption work, and the patterns of users to use encryption algorithms. Actually, the difficulty of decryption is varied by the limitations.

Therefore, conditions are preferably set beforehand on the complexity and the amount of available plaintext, and an efficient decryption method under the conditions is used to determine whether to allow decryption.

The present invention combines the exhaustive search with an algebraic method, which sets conditions for resources such as the complexity and the number of plaintext available for decryption beforehand, optimizes a decryption method under the set conditions on the basis of the conditions, and allows an efficient search of solutions for the decryption equation. Thus, cipher strength evaluation is allowed when the available resources have met the conditions.

More specifically, a cipher strength evaluation apparatus for evaluating strength on ciphertext outputted by a block encryption apparatus having a plurality of steps of accepting unstirred text, stirring with an extended key, and outputting stirred text for encrypting plaintext step by step, the cipher strength evaluation apparatus includes:

a receiving part for accepting decryption condition information about the number of available plaintext;

a decryption equation information storing part for storing decryption equation information expressing a decryption equation that has a value of extended key forming bits to form an extended key as an unknown, and holds on unstirred text at a previous step being a given step of the steps and stirred text at a subsequent step being a given step subsequent to the previous step;

a linearizing part for converting the decryption equation to a linearized decryption equation being linear simultaneous equations as a value expressing higher-order terms of the extended key forming bits of the decryption equation is an independent unknown, and outputting linearized decryption equation information expressing the linearized decryption equation;

an estimating part for selecting a predetermined number of bits expressed by the decryption condition information from unknowns of the linearized decryption equation as an estimated unknown, and outputting estimated unknown value information expressing an estimated unknown value estimated as a value of the estimated unknown;

an optimizing part for outputting optimized decryption equation information being information expressing an optimized linearized decryption equation that is an equation obtained by reducing unknowns by inputting the estimated unknown value to the linearized decryption equation and by reducing an element equation number being the number of element equations based on linear dependence between the element equations being equations contained in the linearized decryption equation;

an operation part for outputting evaluation information being information expressing whether the optimized linearized decryption equation is outputted to hold or not, and extended key forming bit value information expressing a value of the unknown of the decryption equation when it holds; and a control part for allowing the estimating part to output a new estimated unknown value when the evaluation information does not hold.

In the apparatus thus configured, the number of the estimated unknowns being unknowns estimated and temporarily determined by the estimating part is determined based on the decryption condition information accepted by the receiving part, and then the maximum value of the number of plaintext required for decryption is determined. Therefore, the difficulty of decryption can be evaluated under conditions that the number of available plaintext has limitations.

At this time, the optimizing part not only removes the estimated unknowns having been estimated from the linearized decryption equation as object values, but also utilizes the resulting linear dependence to optimize the linearized decryption equation. Therefore, the cipher strength of multiple pieces of encryption apparatus can be compared under the condition that a certain number of plaintext is available, for example.

Here, it is more convenient that the decryption condition information accepted by the receiving part further contains information about the available complexity, and the control part allows the estimating part to output estimated unknowns based on the element equation number outputted by the optimizing part.

In the apparatus thus configured, in the case where the control part compares the decryption condition information accepted by the receiving part with the element equation number outputted by the optimizing part and finds that the element equation number is large and the complexity required for decryption becomes greater than a predetermined complexity, the control part allows the estimating part to again select a new estimated unknown estimated and temporarily determined by the estimating part. Thus, the scheme to determine estimated unknowns is optimized, and it can be determined whether to allow decryption under the conditions that the number of plaintext equal to a certain number or below and the complexity equal to a certain complexity or below are available.

Also at this time, when only the complexity and the number of plaintext required for decryption are determined under certain conditions, the operation part can be omitted.

Moreover, in the case of evaluating the strength of an encryption apparatus having a stirring step where an extended key is not expressed in the decryption equation, the estimating part outputs an estimated outer extended key forming bit value estimated as a value of outer extended key forming bits that is extended key forming bits at outer steps being steps before the previous step and after the subsequent step for use in outputting unstirred text at the previous step and stirred text at the subsequent step. Also in this manner, the maximum number of plaintext required for decryption can be secured.

BRIEF DESCRIPTION OF THE DRAWINGS

The teachings of the invention can be readily understood by considering the following detailed description in conjunction with the accompanying drawings, in which.

DESCRIPTION OF THE PREFERRED EMBODIMENT

Hereinafter, an embodiment of the invention will be described.

Figure 7:
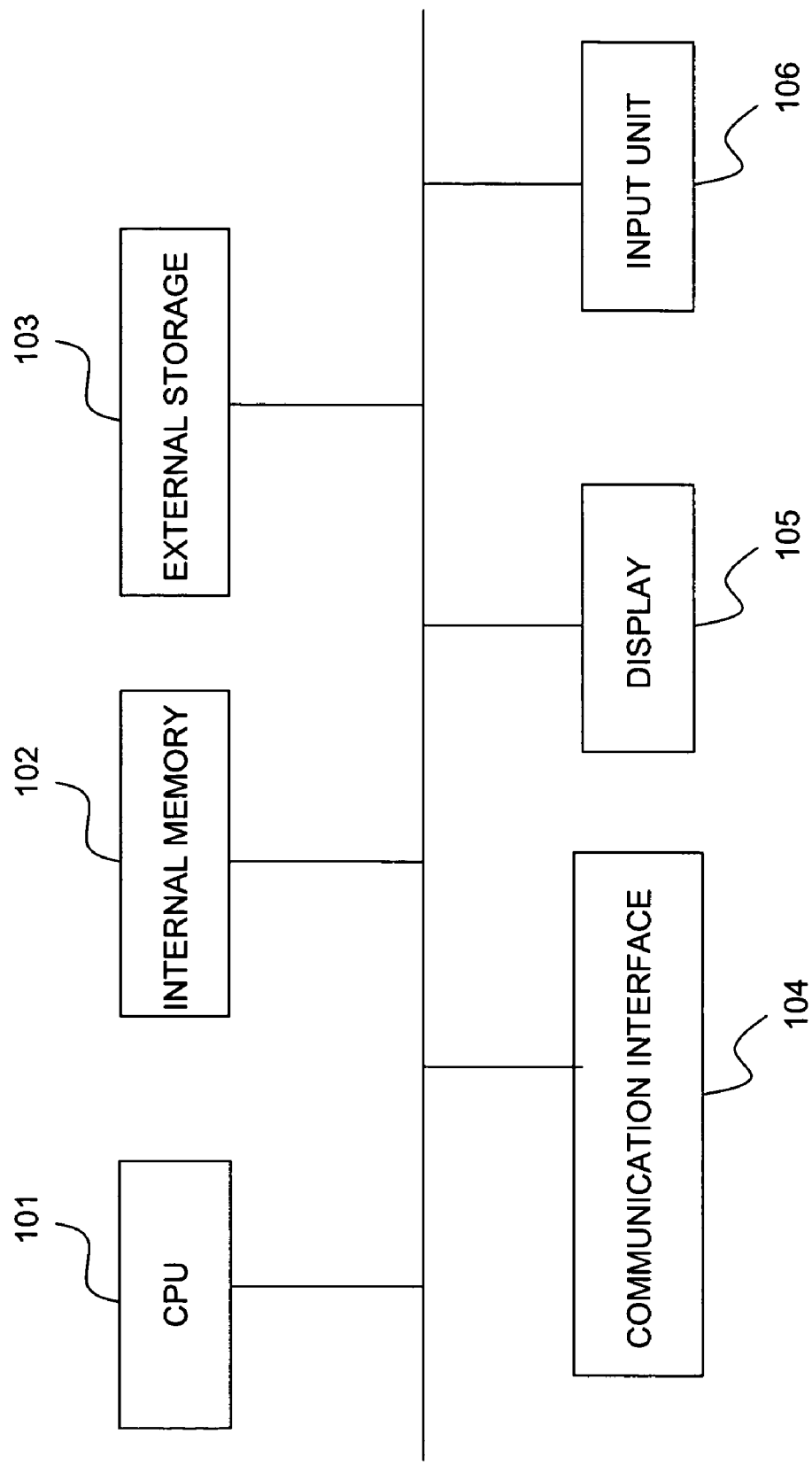
FIG. 7 is a hardware block diagram illustrating the configuration of hardware in an embodiment according to the invention.

FIG. 7 is a block diagram illustrating the hardware configuration of a cipher strength evaluation apparatus 1 of this embodiment. As shown in FIG. 7, the cipher strength evaluation apparatus 1 is a general purpose computer, for example, having a CPU 101, an internal memory 102, an external storage 103 such as HDD, a communication interface 104 such as a modem for connecting to communication networks, a display 105, and an input apparatus 106 such as a mouse and a keyboard.

Figure 1:
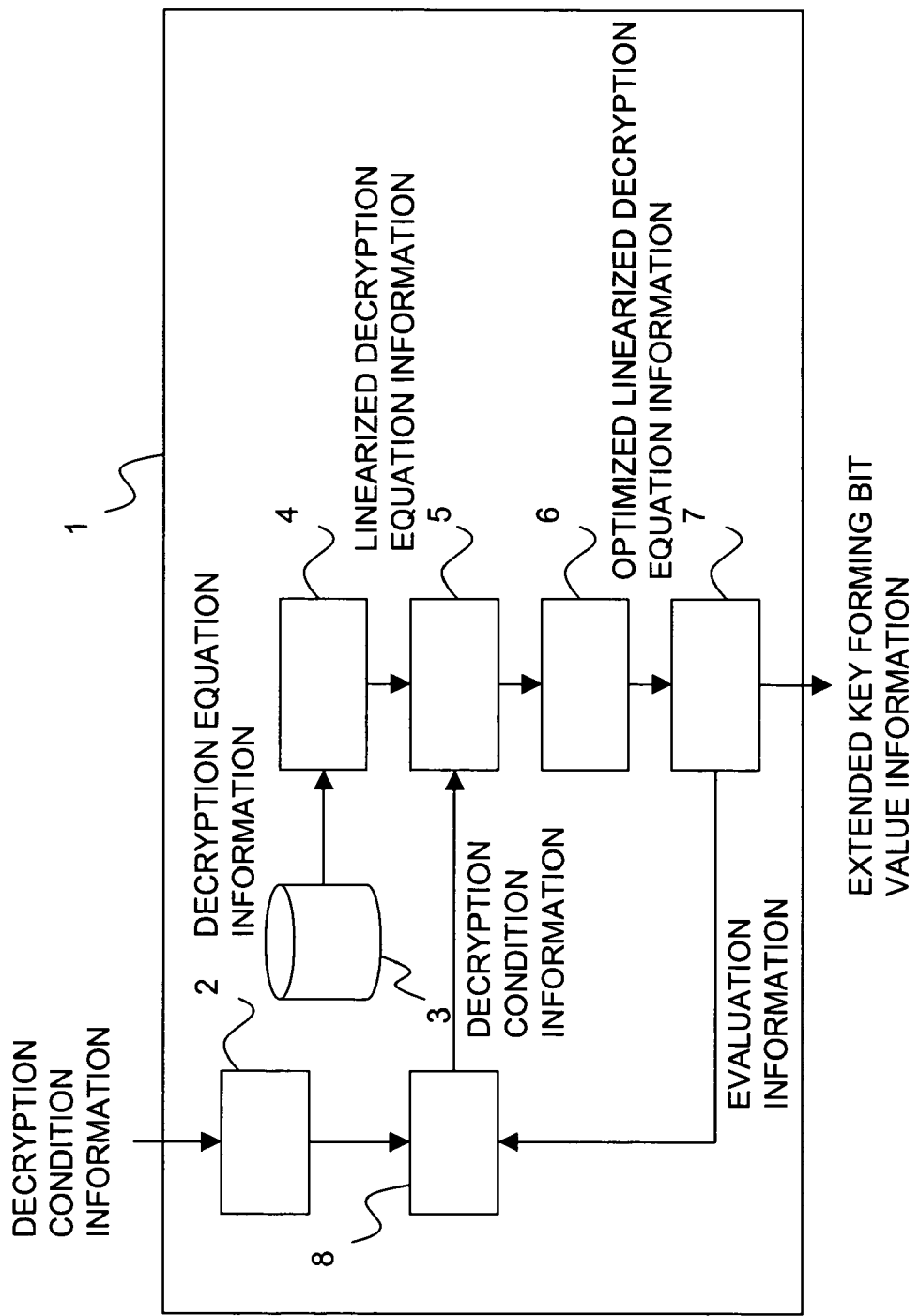
FIG. 1 is a function block diagram illustrating the functional configuration of a cipher strength evaluation apparatus according to claim 1 of the invention.
Figure 2:
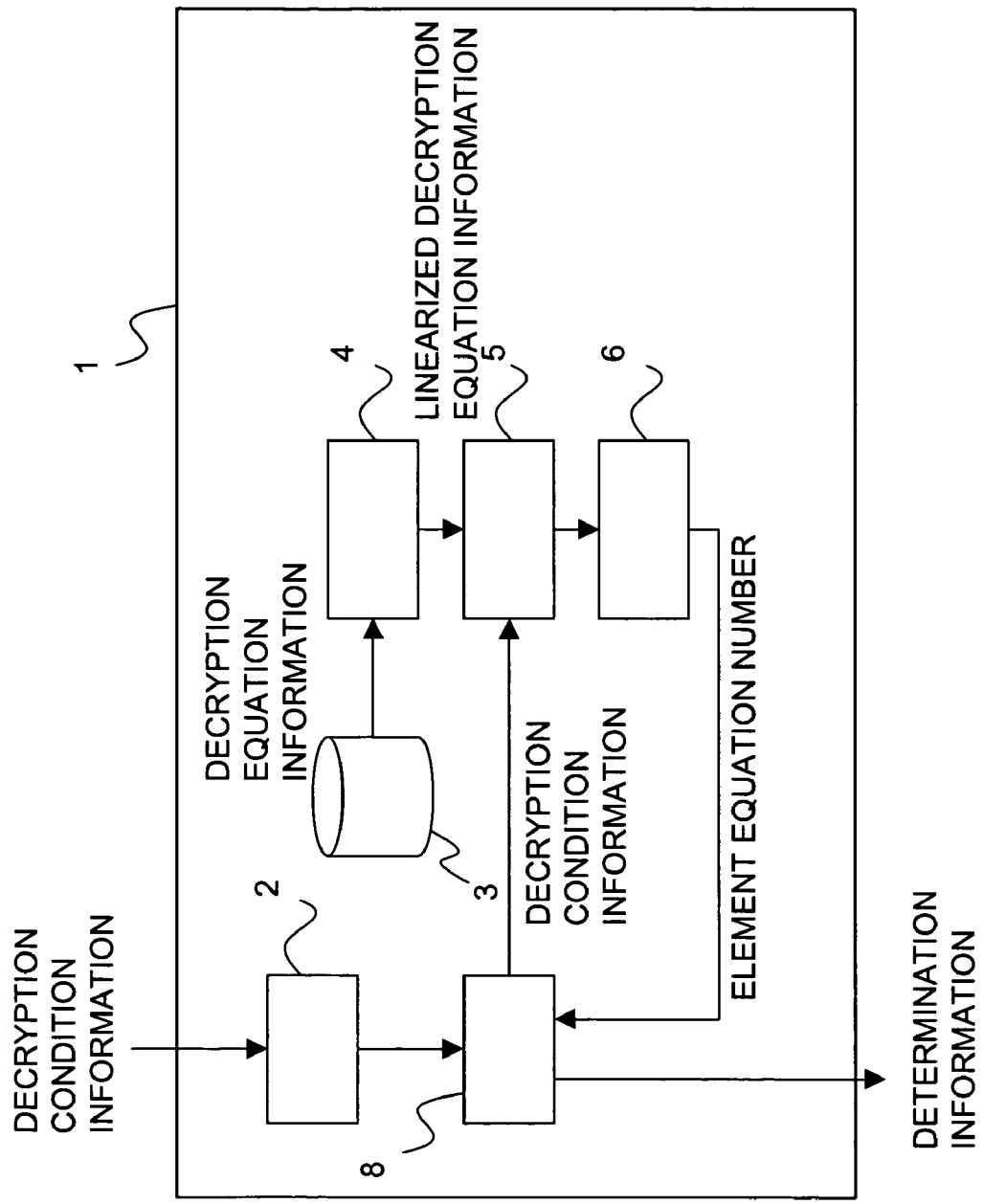
FIG. 2 is a function block diagram illustrating the functional configuration of a cipher strength evaluation apparatus according to claim 2 of the invention.
Figure 3:
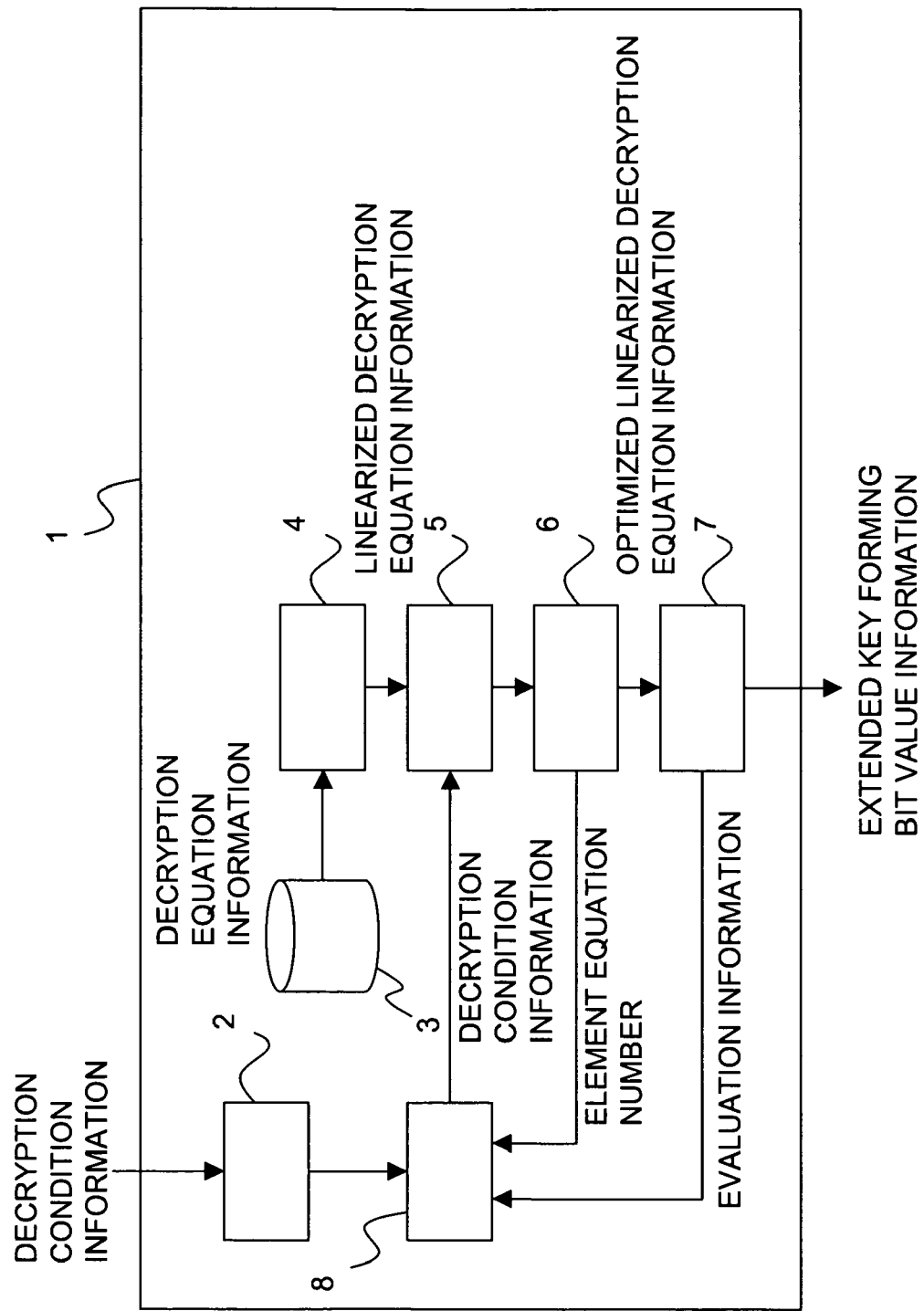
FIG. 3 is a function block diagram illustrating the functional configuration of a cipher strength evaluation apparatus according to claim 3 of the invention.
Figure 4:
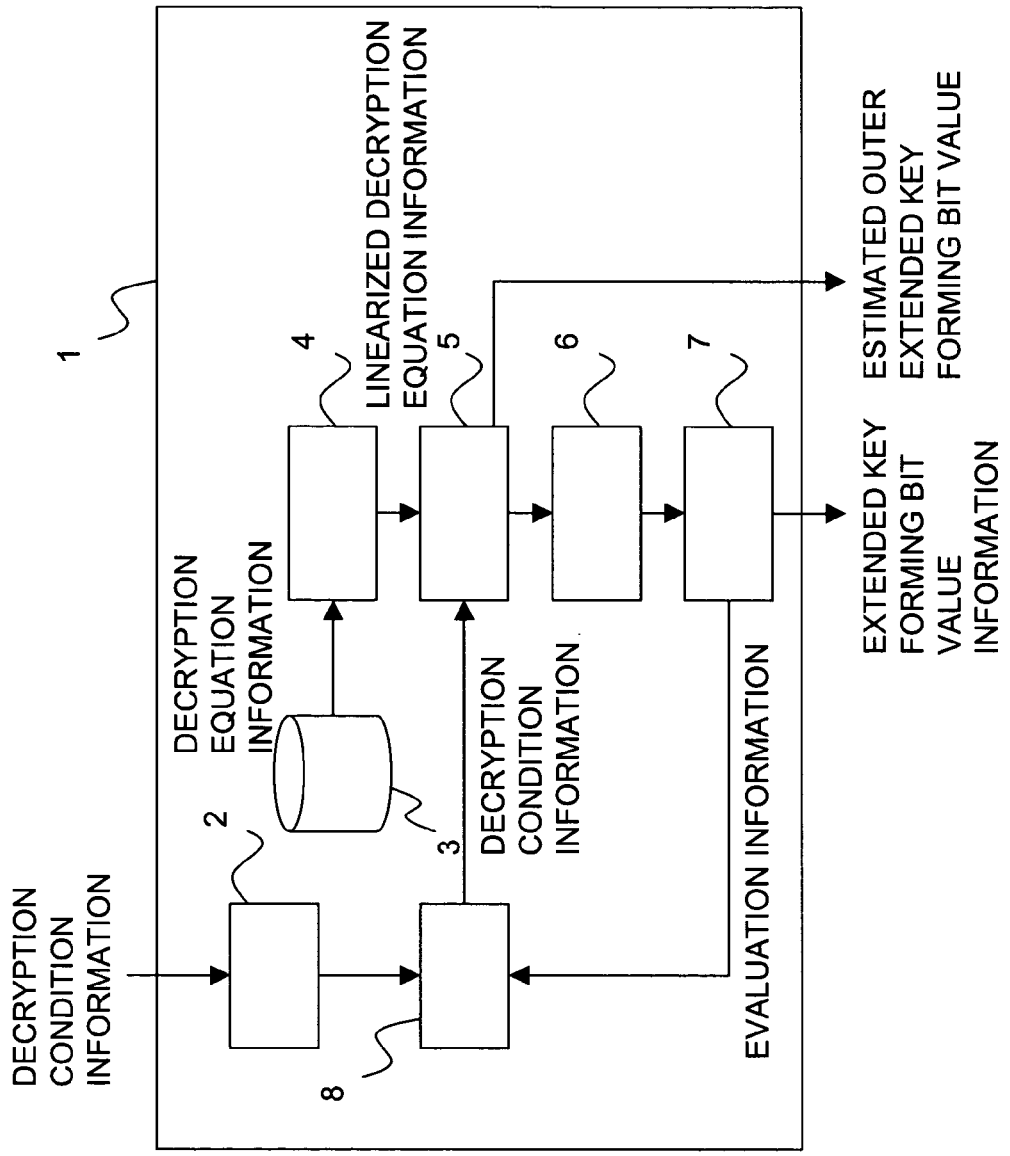
FIG. 4 is a function block diagram illustrating the functional configuration of a cipher strength evaluation apparatus according to claim 4 of the invention.
Figure 5:
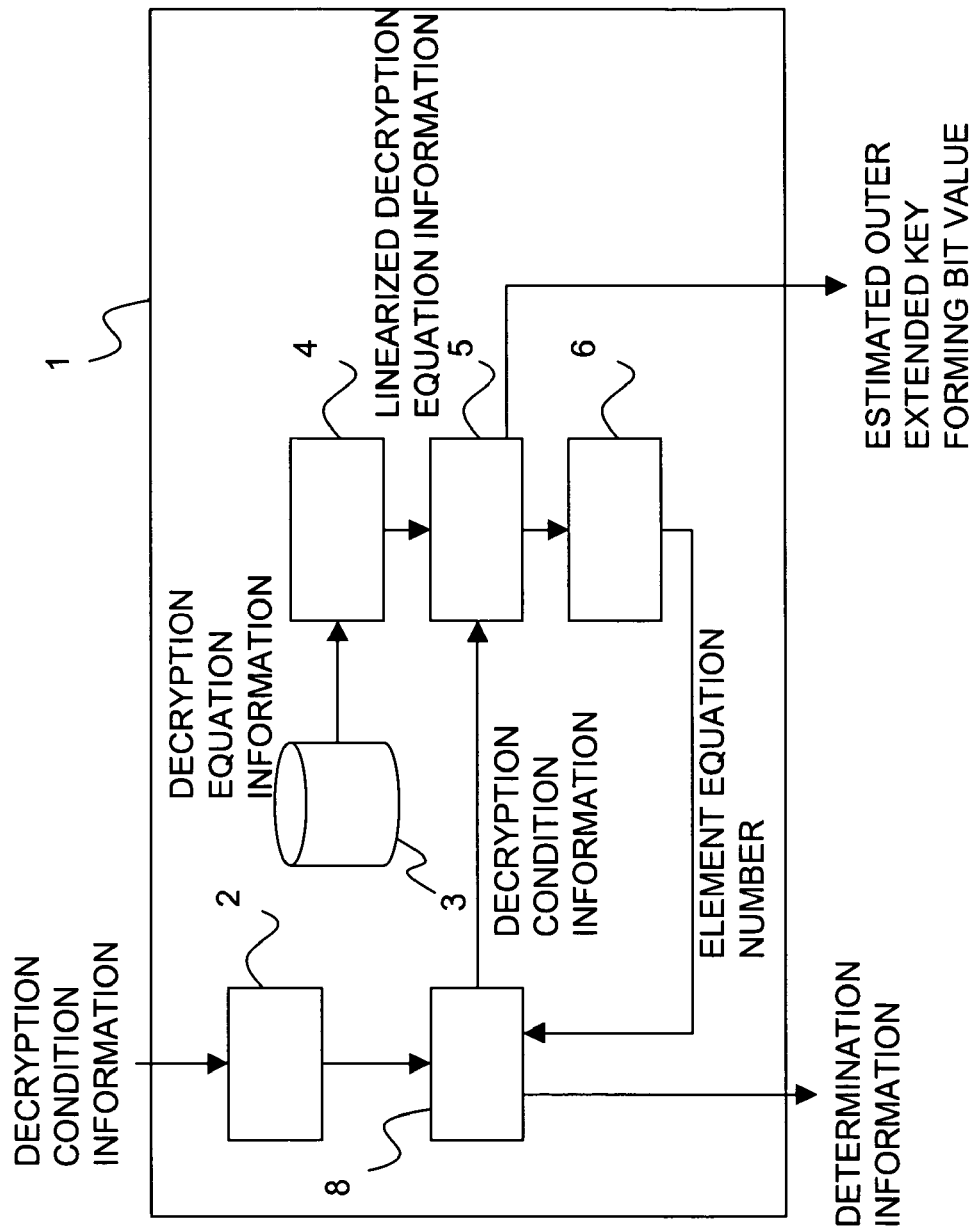
FIG. 5 is a function block diagram illustrating the functional configuration of a cipher strength evaluation apparatus according to claim 5 of the invention.
Figure 6:
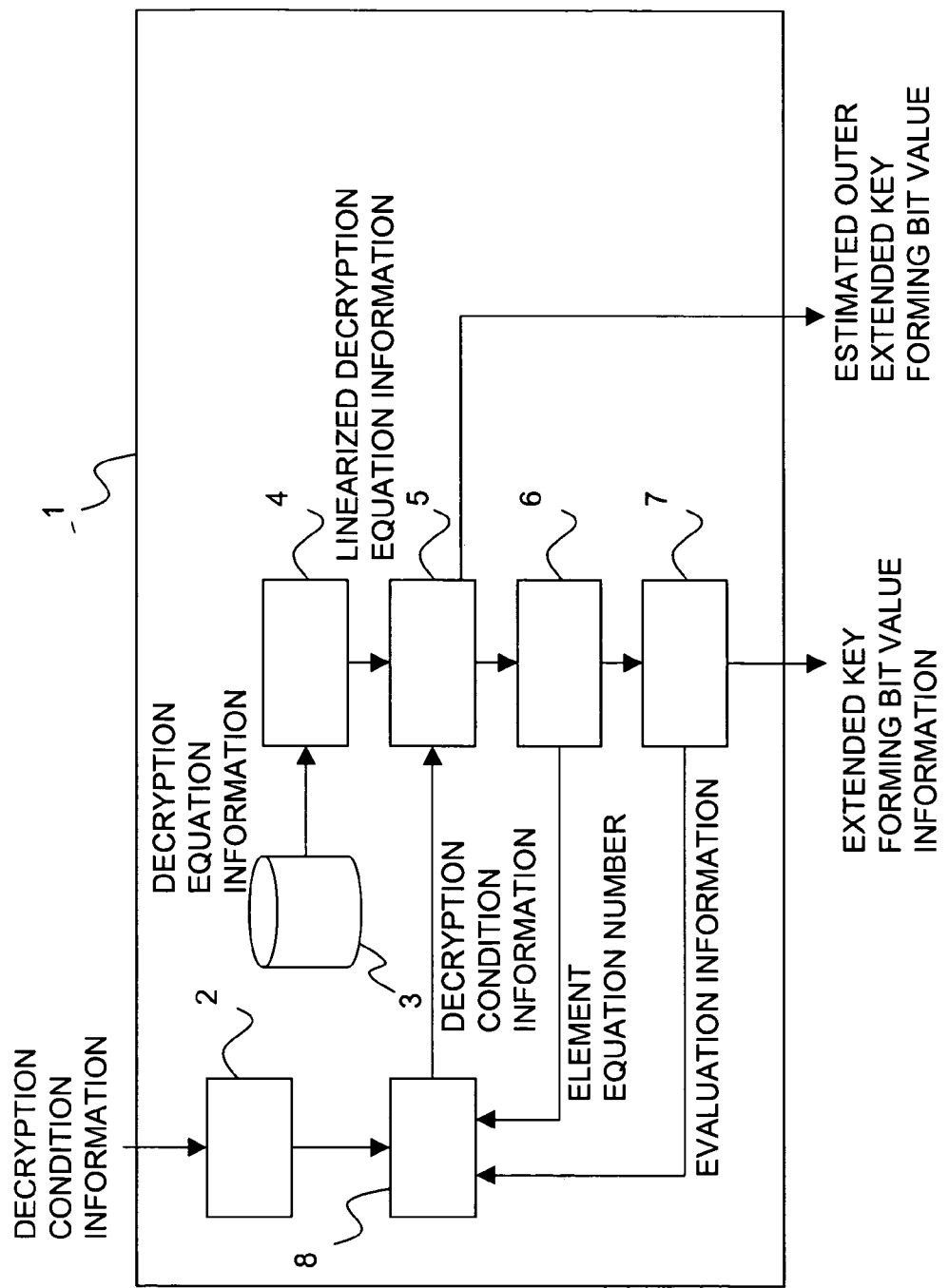
FIG. 6 is a function block diagram illustrating the functional configuration of a cipher strength evaluation apparatus according to claim 6 of the invention.

In the embodiment, as shown in FIG. 3, a predetermined program is installed in the computer, and the CPU 101 and peripheral devices are operated together based on the program, and then the apparatus is allowed to function as a receiving part 2, a decryption equation information storing part 3, a linearizing part 4, an estimating part 5, an optimizing part 6, an operation part 7, and a control part 8.

Hereinafter, each of the parts will be described in detail.

The cipher strength evaluation apparatus 1 has a configuration shown in FIG. 3, which is formed to evaluate the strength of a Feistel block cipher.

Here, a Feistel encryption algorithm has a plurality of stirring steps of separating stirred text into two sub-blocks right and left, forming one sub-block as the sub-block of unstirred text as it is, and outputting unstirred text with the other sub-block having performed stirring for encrypting plaintext step by step.

The receiving part 2 accepts decryption condition information that is information about the number of available plaintext and the complexity.

The performance of computers and the availability of plaintext have limitations in accordance with environments in which people attempt decryption and do decryption work, and the patterns of users to use encryption algorithms. Actually, the difficulty of decryption is varied by the limitations. Therefore, the complexity and the maximum amount of the number of available plaintext are preferably set beforehand in cipher strength evaluation.

The decryption equation information storing part 3 stores decryption equation information expressing a decryption equation that has a value of extended key forming bits to form an extended key as an unknown, and holds on unstirred text at a previous step being a given step of the steps and stirred text at a subsequent step being a given step subsequent to the previous step.

The decryption equation information that holds on an encryption system for evaluation needs to be stored beforehand.

In the embodiment, the decryption equation is an equation derived from a higher order differential decryption method, which utilizes the property of higher-order differential of discrete function $E(\bullet)$ expressing inputs and outputs of a stirring part.

Hereinafter, the detail of equations based on the higher order differential decryption method will be described.

Let $E(\bullet)$ be a function as follows.

$$Y = E(X; K), \quad (1)$$

where unstirred text is $X \in GF(2)^n$, stirred text is $Y \in GF(2)^m$, an extended key is $K \in GF(2)^s$. Let $\{A1, \ldots, Ai\}$ be a set of linear independent vectors in $GF(2)^n$, and $V(i)$ be the subspace spanned by these vectors.

Then, the ith order differential $\Delta_{V(i)}^{(i)}$ of $E(\bullet)$ is defined as follows.

$$\Delta_{V(i)}^{(i)} E(X; K) = \sum_{A \in V(i)} E(X + A; K), \quad (2)$$

V(i) is the variable sub-block, and the subspace except V(i) is the fixed sub-block. In the following, $\Delta^{(i)}$ denotes $\Delta_{V(i)}^{(i)}$, when not defined particularly.

At this time, suppose the degree of X is D in $E(X;K)$. Property 1: Suppose the degree of $E(X;K)$ with respect to X equals to D, then $$deg x\{E(X;K)\} = \begin{cases} \Delta^{(D+1)} E(X; K) = 0 \\ \Delta^{(D)} E(X; K) = const. \end{cases}$$

Consider a block cipher formed of R steps. Let $E_i(\bullet)$ be an ith-step stirring function, $GF(2)^n \times GF(2)^{i \times s} \to GF(2)^m$, and $H_{(R-1)}(X)$ is (R-1)th step stirred text where X is accepted as unstirred text.

$$H_{(R-1)}(X) = E_{(R-1)}(X; K_1, \ldots, K_{(R-1)}), \quad (3)$$

where $K_i$ denotes an extended key at the ith step.

Suppose the degree of $E_{(R-1)}(\bullet)$ with respect to X is D-1, then $$\Delta_{V^{(D)}}^{(D)} H_{(R-1)}(X) = 0, \quad (4)$$

Let $\tilde{E}(\bullet)$ be a function, which outputs $H_{(R-1)}$ from ciphertext $C \in GF(2)^n$, $$H_{(R-1)}(X) = \tilde{E}(C(X); K_R) \quad (5)$$

The following equation holds from Equations (4) and (5), and Property 1.

$$0 = \sum_{A \in V^{(D)}} \tilde{E}(C(X + A); K_R) \quad (6)$$

In the embodiment, this Equation (6) is called the decryption equation.

By the algebraic method, the linearizing part 4 converts the decryption equation to a linearized decryption equation being linear simultaneous equations as a value expressing higher-order terms of the extended key forming bits of the decryption equation is an independent unknown, and outputs linearized decryption equation information expressing the linearized decryption equation.

Here, the algebraic method will be described below.

The algebraic method is done by replacing higher-order terms such as $X_i \cdot X_j$ with a new independent variable such as $y_{ij}$, for example. An equation that has converted each term of the decryption equation in this manner is called the linearized decryption equation. Suppose the decryption equation is linearized to obtain an evaluation equation and the number of unknowns contained in the evaluation equation is L, the decryption equation can be rewritten as follows because the decryption equation is derived from the use of an m-bit sub-block.

$$A'k = b' \quad (7)$$

$$k = {}^t(k^{(1)}, k^{(2)}, \ldots, k^{(s)}, k^{(1)}k^{(2)}, k^{(1)}k^{(3)}, \ldots, k^{(1)}k^{(2)} \ldots k^{(s)}),$$

Here, A' and b' are an m×L coefficient matrix, b' is an m-dimensional solution vector, and k is an L-dimensional vector over FG(2), where k is unknowns, $KR=(k^{(1)}, k^{(2)}, \ldots, k^{(s)}) \in GF(2)^s$. Since the decryption equation is an m-bit equation, m linearized decryption equations can be obtained from one Dth order differential. Therefore, ($\lfloor L/m \rfloor$) sets of the Dth order differential are needed for the unique solution.

Then, $$Ak = b, \quad (8)$$

where A is a $\lfloor L/m \rfloor \times L$ matrix, and b is a $\lfloor L/m \rfloor$ vector.

Here, since one set of the Dth order differential requires $2^D$ of selected plaintext, then estimation is $$M \simeq 2^D \times \left\lfloor \frac{L}{m} \right\rfloor. \quad (9)$$

where the number of required plaintext is set to M.

The estimating part 5 selects a predetermined number of bits expressed by the decryption condition information from unknowns of the linearized decryption equation as an estimated unknown, and outputs estimated unknown value information expressing an estimated unknown value estimated as a value of the estimated unknown.

That is, it estimates some of unknowns of the decryption equation for temporary determination. In this manner, the decryption equation is considered to hold probabilistically, and then it is necessary to determine whether estimated extended key bits are true.

Consider the case where Equation (8) holds from a linearized decryption equations, and a $\lfloor (1+\alpha)/m \rfloor \times L$ matrix A and a $(1+\alpha)$-dimensional vector b.

Since it is already known that the rank of the matrix A equals to 1, the linearized decryption equation always holds when the estimated extended key bits are true, and the vector b is in the 1-dimensional space. On the other hand, it can be considered that the matrix A and the vector b are selected at random when the estimated extended key bits are false. Then, the linearized decryption equation never has a solution when the vector b is not an element in the 1-dimensional space. Therefore, false estimated extended key bits can be known.

The probability P that tells false estimated extended key bits equals to a probability that an extracted element in $(1+\alpha)$-dimensional space is contained in the 1-dimensional space.

Therefore, $$P = \frac{2^l}{2^{l+\alpha}} = 2^{-\alpha}, \quad (10)$$

When u bits of estimated extended key bits are estimated, it is necessary to prepare additional $\alpha$ linearized decryption equations that satisfy the following condition in order to tell all the false estimated extended key bits.

$$2^{-\alpha} \times 2^u \ll 1. \quad (11)$$

Here, in the embodiment, the relationship, the number of plaintext=unknown/S+$\alpha$, $2-\alpha \times 2u \ll 1$, holds from Equations (9) and (11), where S is bits of a sub-block of the decryption equation and proportional to the decryption equation. When the number of unknowns is defined over a given predetermined decryption equation, the maximum number of plaintext required for decryption can be determined. Conversely, when the maximum number of plaintext is determined, the unknown can be determined.

Furthermore, when the decryption equation holds on unstirred text at a previous step being a given step and stirred text at a subsequent step subsequent to the previous step, the apparatus is configured to output an estimated outer extended key forming bit value estimated as a value of outer extended key forming bits that is extended key forming bits at outer steps being steps before the previous step and after the subsequent step. Thus, extended keys that are not expressed in the decryption equation can be estimated as well to allow decryption as the condition for the number of available plaintext is satisfied.

In this case, an encryption/decryption apparatus is allowed to calculate the unstirred text at the previous step or/and the stirred text at the subsequent step based on the estimated outer extended key forming bit value having been estimated. Then, the number of the outer extended key forming bits where the value has been estimated is added to the number of unknowns, and the number of available plaintext can be secured.

The optimizing part 6 outputs optimized linearized decryption equation information being information expressing an optimized linearized decryption equation that is an equation obtained by reducing unknowns by inputting the estimated unknown value to the linearized decryption equation and by reducing an element equation number being the number of element equations based on linear dependence between the element equations being equations contained in the linearized decryption equation. When only the number of plaintext and the complexity required for decryption are desired to be obtained, not to do cipher decryption, the number of the element equations can be obtained from calculation of the rank of matrix A.

Hereinafter, it will be described in detail.

The selected plaintext and the complexity required for operations according to the algebraic method depend on the order D and the number of unknowns of the decryption equation.

Consider the linear dependence of individual unknowns, and then it can be expressed as $ax_i + ax_j = a(x_i + x_j) = ay_{ij}$, for example, where $y_{ij}$ is a new variable (hereinafter, it is called an independent unknown).

Such a relationship can reduce the number of unknowns, and the complexity of the algebraic method can be decreased.

When it can be analyzed that the number of unknowns is $1(\leq L)$ in Equation (8), it is enough to solve the decryption equation with $\lceil l/m \rceil \times L$ matrix A and the $\lceil l/m \rceil$-dimensional vector b. Therefore, when $1 \leq L$ holds, the complexity and the number of selected plaintext required for solving Equation (8) can be decreased.

To know the number of independent unknowns 1, Theorem 1 below can be used.

Theorem 1: The expectation of d is equal to or below q+2, when d is defined as $$dim_{GF(p)}(v_1, v_2, \ldots, v_d) = q$$

$V_i$ is selected at random from the q-dimensional vector space over GF(p).

Proof: An element selected at random from the q-dimensional vector space over GF(p) is contained in a particular i-dimensional ($i \leq q$) subspace with the probability $$\frac{p^i}{p^q},$$

and average $$\frac{1}{1 - \frac{p^i}{p^i}}$$

elements need to be selected in order to fine one element that is not contained in the subspace. Thus, the expectation of d can be evaluated as follows.

$$\sum_{i=0}^{q-1} \frac{1}{1 - \left(\frac{1}{p}\right)^{q-1}} = \sum_{i=0}^{q-1} \left(1 + \frac{1}{p^{q-i} - 1}\right)$$

$$= q + \sum_{i=1}^{q} \frac{1}{p^i - 1}$$

$$= q + \frac{1}{p - 1} + \sum_{i=2}^{q} \frac{1}{p^i - 1} <$$

$$q + \frac{1}{p - 1} + \sum_{i=1}^{q-1} \frac{1}{p^{i-1}} \leq q + 2$$

Before a target block cipher is decrypted, L+2 linearized decryption equations are prepared for simulation and coefficient matrix A is calculated. Then, the number of independent unknowns can be found, and the number of plaintext required for decryption can be determined.

The operation part 7 outputs evaluation information being information expressing whether the optimized linearized decryption equation is outputted to hold or not, and extended key forming bit value information expressing a value of the unknown of the decryption equation when it holds.

When the value of an estimated unknown is not outputted properly, the optimized linearized decryption equation is impossible, and it does not hold.

The control part 8 allows the estimating part 5 to output a new estimated outer extended key forming bit value and a new estimated unknown value when the evaluation information does not hold.

When the optimized linearized decryption equation does not hold, the estimating part repeatedly again outputs estimated unknown values. When it holds, the true extended key can be outputted.

Moreover, when the number of the element equations becomes equal to or greater than a predetermined value determined from decryption condition information, an estimated unknown is newly selected. Then, an estimated unknown that can reduce the complexity can be searched as the condition for the number of available plaintext is satisfied.

Figure 8:
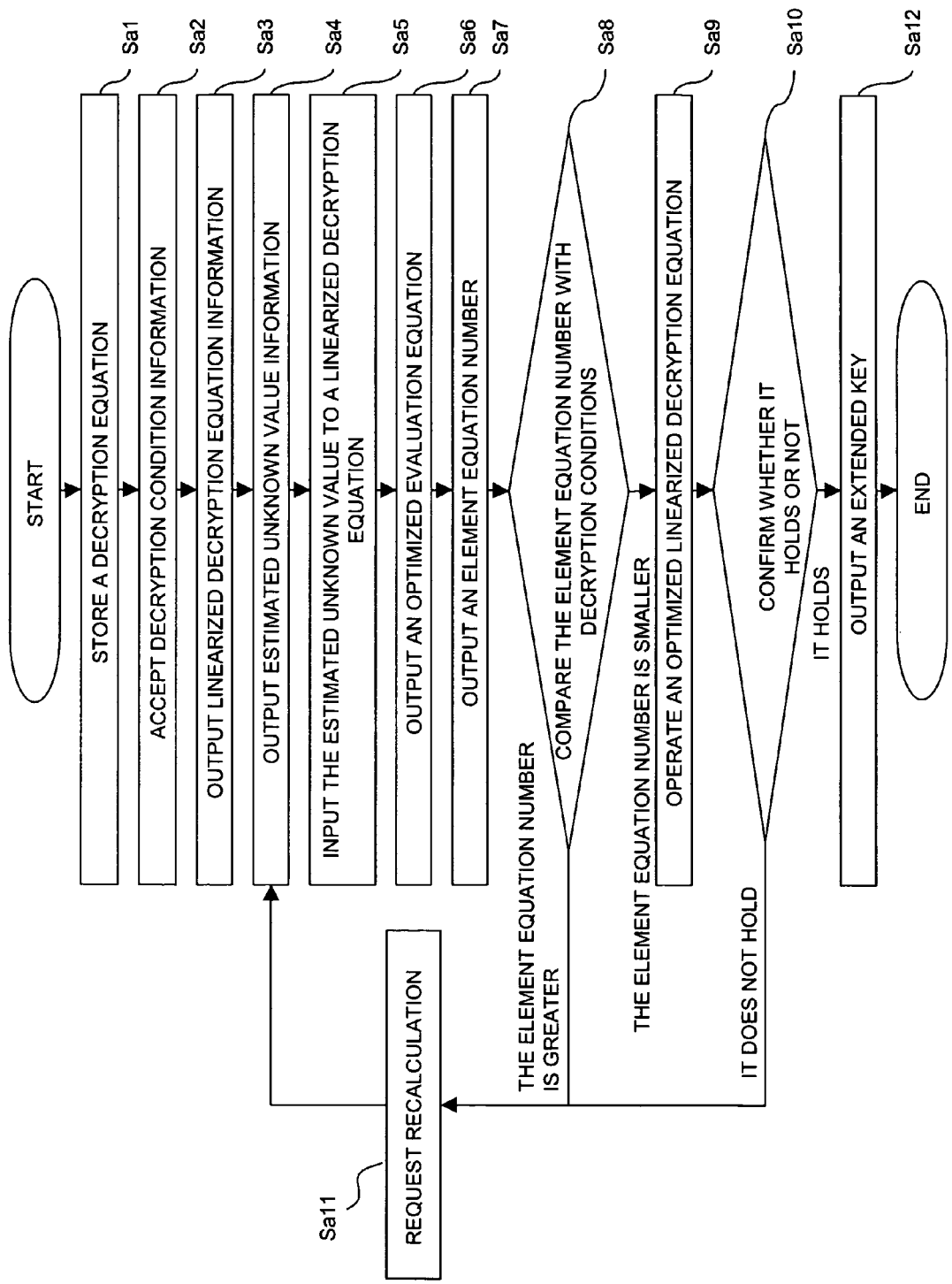
FIG. 8 is a flowchart for describing an example of the operation of cipher strength evaluation in the embodiment.

Hereinafter, an exemplary operation of the cipher strength evaluation apparatus shown in FIG. 3 will be described with reference to a flowchart shown in FIG. 8.

A decryption equation creating part, not shown, calculates a decryption equation based on unstirred text at a previous step and stirred text at a subsequent step, and stores it in the decryption equation information storing part 3 (Sa1).

The receiving part 2 accepts decryption condition information being information about the maximum number of available plaintext and the complexity (Sa2).

The linearizing part 4 outputs linearized decryption equation information with the algebraic method based on the decryption equation information expressing the decryption equation (Sa3).

The estimating part 5 selects the number of estimated unknowns based on decryption conditions, and outputs estimated unknown value information (Sa4).

The optimizing part 6 inputs the estimated unknown value to a linearized decryption equation (Sa5).

The optimizing part 6 calculates an optimized evaluation equation with the use of linear dependence that holds between element equations (Sa6).

The optimizing part 6 calculates an element equation number (Sa7).

The control part 8 compares the element equation number with the decryption conditions (Sa8), and allows the estimating part 5 to select an estimated unknown again and to output the estimated unknown value when the element equation number is equal to or greater than a predetermined value determined from the decryption condition information.

The operation part 7 operates an optimized linearized decryption equation (Sa9), and outputs evaluation information expressing whether the equation holds or not.

The control part 8 confirms whether it holds or not based on the evaluation information (Sa10).

When the evaluation information shows that it does not hold, the control part 8 requests the estimating part 5 to recalculate an estimated unknown value (Sa11).

The operation part 7 calculates an extended key when the optimized linearized decryption equation holds (Sa12).

In this manner, decryption can be performed under practical conditions with limitations on the maximum number of available plaintext. Furthermore, when the available complexity also has limitations, the complexity required for decryption is estimated from the number of the element equations, the selection of estimated unknowns is optimized, and the complexity is reduced to allow the determination whether decryption is possible.

Moreover, in the case of calculating an estimated outer extended key forming bit value estimated as a value of outer extended key forming bits that is extended key forming bits at outer steps being steps before the previous step and after the subsequent step, the estimating part 5 first calculates an estimated outer extended key forming bit value, and based on the estimated outer extended key forming bit value estimated, the encryption/decryption apparatus is allowed to calculate unstirred text at the previous step or/and stirred text at the subsequent step for similar processing.

What is claimed is:

1. A cipher strength evaluation apparatus for evaluating strength on ciphertext outputted by a block encryption apparatus having a plurality of steps of accepting unstirred text, stirring with an extended key, and outputting stirred text for encrypting plaintext step by step, the cipher strength evaluation apparatus comprising:

a receiving part for accepting decryption condition information about the number of plaintext available for cipher strength evaluation;

a decryption equation information storing part for storing decryption equation information expressing a decryption equation that has a value of extended key forming bits to form an extended key as an unknown, the decryption equation holding when an unstirred text is at a first step of the plurality of steps and a stirred text is at a second step of the plurality of steps subsequent to the first step;

a linearizing part for converting the decryption equation to a linearized decryption equation that has a value expressing higher-order terms of the extended key forming bits of the decryption equation as an independent unknown and outputting linearized decryption equation information expressing the linearized decryption equation, the linearized decryption equation being linear simultaneous equations;

an estimating part for selecting a predetermined number of bits expressed by the decryption condition information from unknowns of the linearized decryption equation, estimating the value of bits selected from unknowns of the linearized decryption equation for temporary determination, and outputting an estimated unknown value expressing the estimated value of bits selected from unknowns of the linearized decryption equation;

an optimizing part for outputting optimized decryption equation information, the optimized decryption equation information being information expressing an optimized linearized decryption equation, the optimized linearized decryption equation being an equation obtained by reducing unknowns by inputting the estimated unknown value to the linearized decryption equation and by reducing an element equation number, the element equation number being the number of element equations based on linear dependence between the element equations, the element equations being equations contained in the linearized decryption equation;

an operation part for outputting evaluation information, the evaluation information being information expressing whether the optimized linearized decryption equation holds or not, and outputting extended key forming bit value information expressing a value of the unknown of the decryption equation when the optimized linearized decryption equation holds; and a control part for allowing the estimating part to calculate a new estimated unknown value when the evaluation information indicates that the optimized linearized decryption equation does not hold.

2. A cipher strength evaluation apparatus for evaluating strength on ciphertext outputted by a block encryption apparatus having a plurality of steps of accepting unstirred text, stirring with an extended key, and outputting stirred text for encrypting plaintext step by step, the cipher strength evaluation apparatus comprising:

a receiving part for accepting decryption condition information about the number of plaintext and complexity available for cipher strength evaluation;

a decryption equation information storing part for storing decryption equation information expressing a decryption equation that has a value of extended key forming bits to form an extended key as an unknown, the decryption equation holding when an unstirred text is at a first step of the plurality of steps and a stirred text is at a second step of the plurality of steps subsequent to the first step;

a linearizing part for converting the decryption equation to a linearized decryption equation that has a value expressing higher-order terms of the extended key forming bits of the decryption equation as an independent unknown, and outputting linearized decryption equation information expressing the linearized decryption equation, the linearized decryption equation being linear simultaneous equations;

an estimating part for selecting a predetermined number of bits expressed by the decryption condition information from unknowns of the linearized decryption equation, estimating the value of bits selected from unknowns of the linearized decryption equation for temporary determination, and outputting estimated unknown value expressing the estimated value of bits selected from unknowns of the linearized decryption equation;

an optimizing part for outputting optimized decryption equation information, the optimized decryption equation being information expressing an optimized linearized decryption equation, the linearized decryption equation being an equation obtained by reducing unknowns by inputting the estimated unknown value to the linearized decryption equation and by reducing an element equation number, the element equation number being the number of element equations based on linear dependence between the element equations, the element equations being equations contained in the linearized decryption equation, and outputting the element equation number; and a control part for determining whether the element equation number is equal to or greater than a predetermined value determined from the decryption condition information or below the predetermined value, outputting determination information expressing whether the element equation number is equal to or greater than a predetermined value determined from the decryption condition information or below the predetermined value, and allowing the estimating part to output a new estimated unknown value when the element equation number is equal to or greater than the predetermined value.

3. A cipher strength evaluation apparatus for evaluating strength on ciphertext outputted by a block encryption apparatus having a plurality of steps of accepting unstirred text, stirring with an extended key, and outputting stirred text for encrypting plaintext step by step, the cipher strength evaluation apparatus comprising:

a receiving part for accepting decryption condition information about the number of plaintext and complexity available for cipher strength evaluation;

a decryption equation information storing part for storing decryption equation information expressing a decryption equation that has a value of extended key forming bits to form an extended key as an unknown, the decryption equation holding when an unstirred text is at a first step of the plurality of steps and a stirred text is at a second step of the plurality of steps subsequent to the first step;

a linearizing part for converting the decryption equation to a linearized decryption equation that has a value expressing higher-order terms of the extended key forming bits of the decryption equation as an independent unknown, and outputting linearized decryption equation information expressing the linearized decryption equation, the linearized decryption equation being linear simultaneous equations;

an estimating part for selecting a predetermined number of bits expressed by the decryption condition information from unknowns of the linearized decryption equation, estimating the value of bits selected from unknowns of the linearized decryption equation for temporary determination, and outputting estimated unknown value expressing the estimated value of bits selected from unknowns of the linearized decryption equation;

an optimizing part for outputting optimized linearized decryption equation information, the optimized linearized decryption equation information being information expressing an optimized linearized decryption equation, the linearized decryption equation being an equation obtained by reducing unknowns by inputting the estimated unknown value to the linearized decryption equation and by reducing an element equation number, the element equation number being the number of element equations based on linear dependence between the element equations, the element equations being equations contained in the linearized decryption equation, and outputting the element equation number;

an operation part for outputting evaluation information, the evaluation information being information expressing whether the optimized linearized decryption equation holds or not, and outputting extended key forming bit value information expressing a value of the unknown of the decryption equation when the optimized linearized decryption equation holds; and a control part for allowing the estimating part to output a new estimated unknown value when the element equation number is equal to or greater than a predetermined value determined from the decryption condition information or when the evaluation information indicates that the optimized linearized decryption equation does not hold.

4. A cipher strength evaluation apparatus for evaluating strength on ciphertext outputted by a block encryption apparatus having a plurality of steps of accepting unstirred text, stirring with an extended key, and outputting stirred text for encrypting plaintext step by step, the cipher strength evaluation apparatus comprising:

a receiving part for accepting decryption condition information about the number of plaintext available for cipher strength evaluation;

a decryption equation information storing part for storing decryption equation information expressing a decryption equation that has a value of extended key forming bits to form an extended key as an unknown, the decryption equation holding when an unstirred text is at a first step of the plurality of steps and a stirred text is at a second step subsequent to the first step;

a linearizing part for converting the decryption equation to a linearized decryption equation that has a value expressing higher-order terms of the extended key forming bits of the decryption equation as an independent unknown, and outputting linearized decryption equation information expressing the linearized decryption equation, the linearized decryption equation being linear simultaneous equations;

an estimating part for outputting an estimated outer extended key forming bit value, the outer extended key forming bit value estimated as a value of outer extended key forming bits, the outer extended key forming bits being extended key forming bits at outer steps, the outer steps being steps before the first step and after the second step, selecting a predetermined number of bits expressed by the decryption condition information from unknowns of the linearized decryption equation, estimating the value of bits selected from unknowns of the linearized decryption equation for temporary determination, and outputting estimated unknown value expressing the estimated value of bits selected from unknowns of the linearized decryption equation;

an optimizing part for outputting optimized decryption equation information, the optimized decryption equation information being information expressing an optimized linearized decryption equation, the linearized decryption equation being an equation obtained by reducing unknowns by inputting the estimated unknown value to the linearized decryption equation and by reducing an element equation number, the element equation number being the number of element equations based on linear dependence between the element equations, the element equations being equations contained in the linearized decryption equation;

an operation part for outputting evaluation information, the evaluation information being information expressing whether the optimized linearized decryption equation holds or not, and outputting extended key forming bit value information expressing a value of the unknown of the decryption equation when the optimized linearized decryption equation holds; and a control part for allowing the estimating part to output a new estimated outer extended key forming bit value or a new estimated unknown value when the evaluation information indicates that the optimized linearized decryption equation does not hold.

5. A cipher strength evaluation apparatus for evaluating strength on ciphertext outputted by a block encryption apparatus having a plurality of steps of accepting unstirred text, stirring with an extended key, and outputting stirred text for encrypting plaintext step by step, the cipher strength evaluation apparatus comprising:

a receiving part for accepting decryption condition information about the number of plaintext and complexity available for cipher strength evaluation;

a decryption equation information storing part for storing decryption equation information expressing a decryption equation that has a value of extended key forming bits to form an extended key as an unknown, the decryption equation holding when an unstirred text is at a first step of the plurality of steps and a stirred text is at a second step subsequent to the first step;

a linearizing part for converting the decryption equation to a linearized decryption equation that has a value expressing higher-order terms of the extended key forming bits of the decryption equation as an independent unknown, and outputting linearized decryption equation information expressing the linearized decryption equation, the linearized decryption equation being linear simultaneous equations;

an estimating part for outputting an estimated outer extended key forming bit value estimated as a value of outer extended key forming bits that is extended key forming bits at outer steps being steps before the previous step and after the subsequent step, selecting a predetermined number of bits expressed by the decryption condition information from unknowns of the linearized decryption equation, estimating the value of bits selected from unknowns of the linearized decryption equation for temporary determination, and outputting estimated unknown value expressing the estimated value of bits selected from unknowns of the linearized decryption equation;

an optimizing part for outputting optimized linearized decryption equation information, the optimized decryption equation information being information expressing an optimized linearized decryption equation, the optimized linearized decryption equation being an equation obtained by reducing unknowns by inputting the estimated unknown value to the linearized decryption equation and by reducing an element equation number, the element equation number being the number of element equations based on linear dependence between the element equations, the element equations being equations contained in the linearized decryption equation, and outputting the element equation number; and a control part for outputting determination information expressing whether the element equation number is equal to or greater than a predetermined value determined from the decryption condition information or below the predetermined value, and allowing the estimating part to output a new estimated outer extended key forming bit value or a new estimated unknown value when the element equation number is equal to or greater than the predetermined value.

6. A cipher strength evaluation apparatus for evaluating strength on ciphertext outputted by a block encryption apparatus having a plurality of steps of accepting unstirred text, stirring with an extended key, and outputting stirred text for encrypting plaintext step by step, the cipher strength evaluation apparatus comprising:

a receiving part for accepting decryption condition information about the number of plaintext and complexity available for cipher strength evaluation;

a decryption equation information storing part for storing decryption equation information expressing a decryption equation that has a value of extended key forming bits to form an extended key as an unknown, the decryption equation holding when an unstirred text is at a first step of the plurality of steps and a stirred text is at a second step of the plurality of steps subsequent to the first step;

a linearizing part for converting the decryption equation to a linearized decryption equation that has a value expressing higher-order terms of the extended key forming bits of the decryption equation as an independent unknown, and outputting linearized decryption equation information expressing the linearized decryption equation, the linearized decryption equation being linear simultaneous equations;

an estimating part for outputting an estimated outer extended key forming bit value estimated as a value of outer extended key forming bits, the outer extended key forming bits being extended key forming bits at outer steps, the outer steps being steps before the first step and after the second step, selecting a predetermined number of bits expressed by the decryption condition information from unknowns of the linearized decryption equation, estimating the value of bits selected from unknowns of the linearized decryption equation for temporary determination, and outputting estimated unknown value expressing the estimated value of bits selected from unknowns of the linearized decryption equation;

an optimizing part for outputting optimized linearized decryption equation information, the optimized linearized decryption equation information being information expressing an optimized linearized decryption equation, the optimized linearized decryption equation being an equation obtained by reducing unknowns by inputting the estimated unknown value to the linearized decryption equation and by reducing an element equation number, the element equation number being the number of element equations based on linear dependence between the element equations, the element equations being equations contained in the linearized decryption equation, and outputting the element equation number;

an operation part for outputting evaluation information, the evaluation information being information expressing whether the optimized linearized decryption equation holds or not, and outputting extended key forming bit value information expressing a value of the unknown of the decryption equation when the optimized linearized equation holds; and a control part for allowing the estimating part to output a new estimated outer extended key forming bit value or estimated unknown value when the element equation number is equal to or greater than a predetermined value determined from the decryption condition information or when the evaluation information indicates that the optimized linearized decryption equation does not hold.

7. The cipher strength evaluation apparatus according to claim 1, wherein the decryption equation is determined from a higher-order differential decryption method.

8. The cipher strength evaluation apparatus according to claim 2, wherein the decryption equation is determined from a higher-order differential decryption method.

9. The cipher strength evaluation apparatus according to claim 3, wherein the decryption equation is determined from a higher-order differential decryption method.

10. The cipher strength evaluation apparatus according to claim 4, wherein the decryption equation is determined from a higher-order differential decryption method.

11. The cipher strength evaluation apparatus according to claim 5, wherein the decryption equation is determined from a higher-order differential decryption method.

12. The cipher strength evaluation apparatus according to claim 6, wherein the decryption equation is determined from a higher-order differential decryption method.

13. A cipher strength evaluation apparatus for evaluating strength on ciphertext outputted by a block encryption apparatus having a plurality of steps of accepting unstirred text, stirring with an extended key, and outputting stirred text for encrypting plaintext step by step, the cipher strength evaluation apparatus comprising:

receiving means for accepting decryption condition information about the number of plaintext available for cipher strength evaluation;

decryption equation information storing means for storing decryption equation information expressing a decryption equation that has a value of extended key forming bits to form an extended key as an unknown, the decryption equation holding when an unstirred text is at a first step of the plurality of steps and a stirred text is at a second step of the plurality of steps subsequent to the first step;

a linearizing means for converting the decryption equation to a linearized decryption equation that has a value expressing higher-order terms of the extended key forming bits of the decryption equation as an independent unknown and outputting linearized decryption equation information expressing the linearized decryption equation, the linearized decryption equation being linear simultaneous equations;

estimating means for selecting a predetermined number of bits expressed by the decryption condition information from unknowns of the linearized decryption equation, estimating the value of bits selected from unknowns of the linearized decryption equation for temporary determination, and outputting an estimated unknown value information expressing the estimated value of bits selected from unknowns of the linearized decryption equation;

optimizing means for outputting optimized decryption equation information, the optimized decryption equation information being information expressing an optimized linearized decryption equation, the optimized linearized decryption equation being an equation obtained by reducing unknowns by inputting the estimated unknown value to the linearized decryption equation and by reducing an element equation number, the element equation number being the number of element equations based on linear dependence between the element equations, the element equations being equations contained in the linearized decryption equation;

operation means for outputting evaluation information, the evaluation information being information expressing whether the optimized linearized decryption equation is outputted to hold holds or not, and outputting extended key forming bit value information expressing a value of the unknown of the decryption equation when the optimized linearized decryption equation holds; and control means for allowing the estimating part to calculate a new estimated unknown value when the evaluation information indicates that the optimized linearized decryption equation does not hold.

\* \* \* \* \*